J. W. LYTTON.
FLOAT.
APPLICATION FILED JUNE 24, 1913.

1,120,070.

Patented Dec. 8, 1914.

2 SHEETS—SHEET 1.

Witnesses
H. C. Robinette
G. M. Stucker

Inventor
Jarard W. Lytton
By Lyons, Cushman & Rea
Attorneys

J. W. LYTTON.
FLOAT.
APPLICATION FILED JUNE 24, 1913.

1,120,070.

Patented Dec. 8, 1914.
2 SHEETS—SHEET 2.

Inventor
Jarard W. Lytton

UNITED STATES PATENT OFFICE.

JARARD W. LYTTON, OF FRANKLIN, VIRGINIA, ASSIGNOR TO LYTTON MANUFACTURING CORPORATION, OF FRANKLIN, VIRGINIA, A CORPORATION OF VIRGINIA.

FLOAT.

1,120,070. Specification of Letters Patent. Patented Dec. 8, 1914.

Application filed June 24, 1913. Serial No. 775,521.

*To all whom it may concern:*

Be it known that I, JARARD W. LYTTON, a citizen of the United States, residing at Franklin, in the county of Southampton and State of Virginia, have invented new and useful Improvements in Floats, of which the following is a specification.

The present invention relates to floats more particularly for use in steam and vacuum traps, in connection with which type of apparatus it will be shown, but it will be understood that it is capable of use in any apparatus where a float is subjected to pressure, or vacuum, or both.

It has for its purpose to provide a float of such construction that it may be made hollow and of very thin material without the danger which is now present of such thin hollow floats being either crushed by pressure, or expanded and distorted by vacuum; and, furthermore, is so constructed that danger of a waterlogged float is eliminated.

In the present drawings, which illustrate one embodiment of my invention, I have shown several adaptations of the float, and its use is illustrated in connection with a conventional steam trap, although it will be understood that the invention resides in the float regardless of the specific apparatus with which it is shown.

Figure 1:
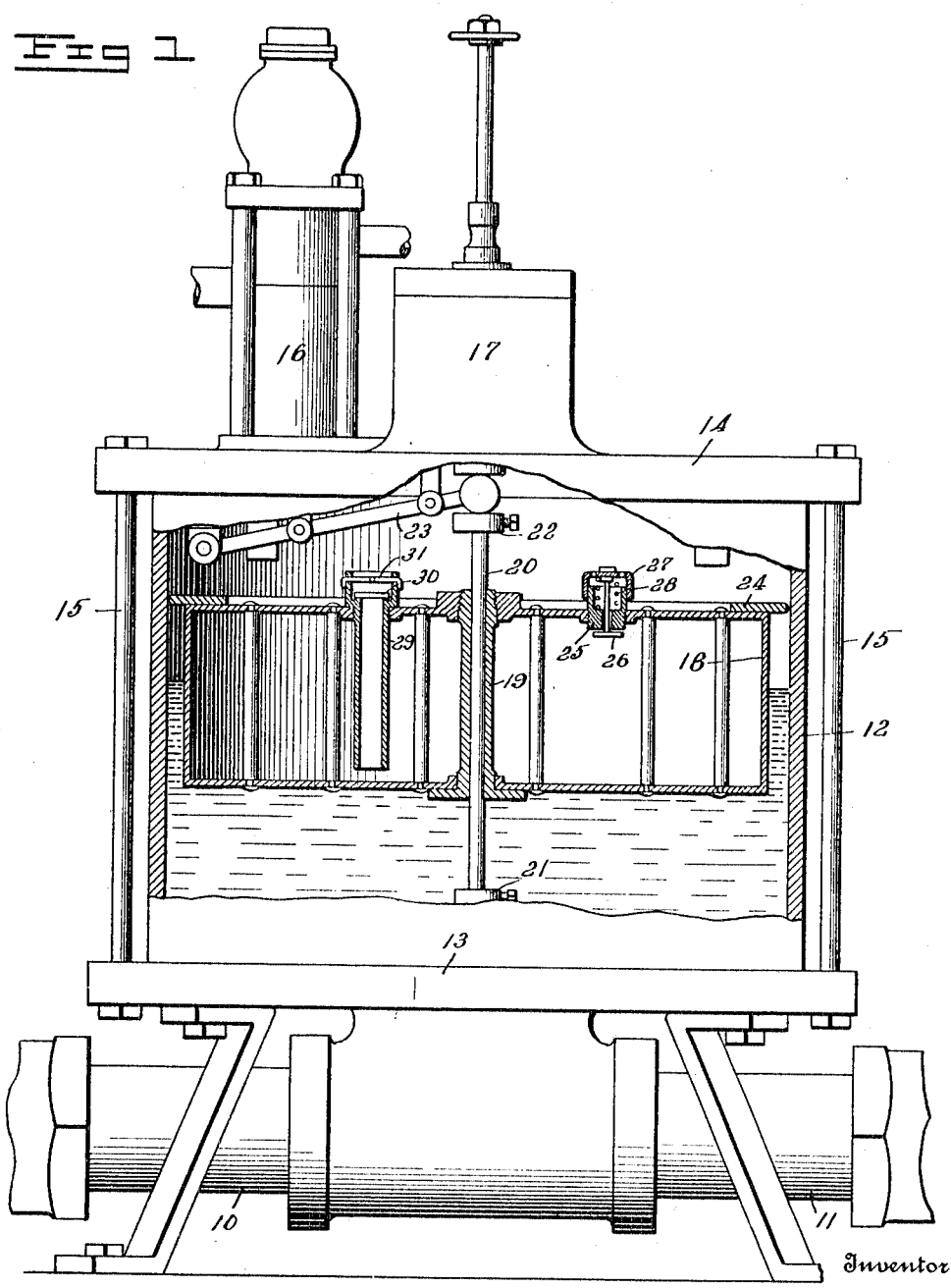
Figure 2:
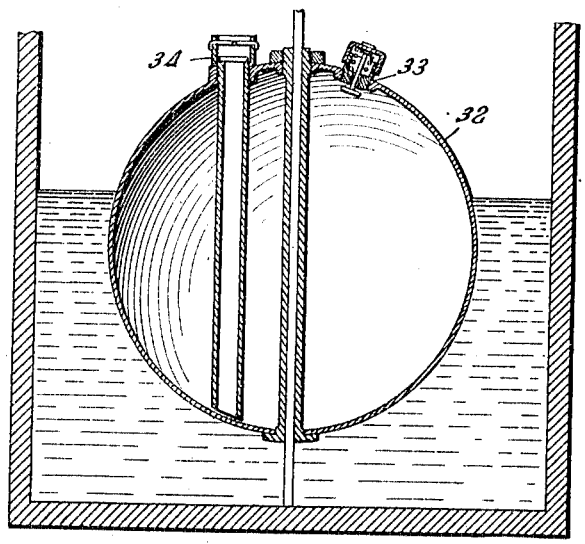
Figure 3:
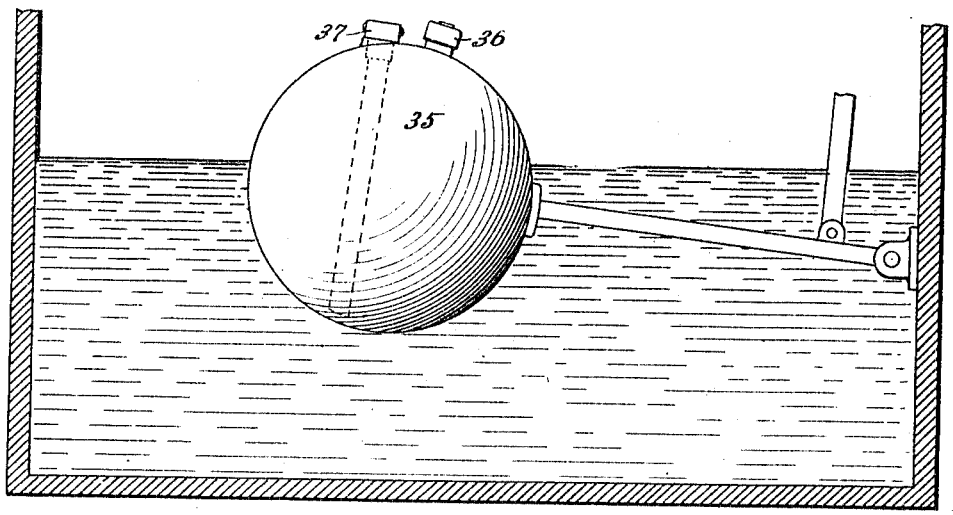

In the drawings:—Figure 1 is a view showing a steam trap of any desired construction, the parts being conventionally illustrated, and provided with my improved float. Fig. 2 is a view of a slightly different form of float. Fig. 3 shows the use of the float as an arm-float instead of a tappet float.

Referring to the drawings by numerals, like numbers indicating like parts in the several views, 10 designates the inlet and 11 the outlet of the trap 12, said trap being provided with the bottom plate 13 and head plate 14, which are preferably fastened together by means of tie bolts 15.

The head plate 14 has the bonnets 16 and 17, which bonnets contain, respectively, the valve-operating mechanism for the steam trap and the tappet rod connections, but since these form no part of the invention herein disclosed I shall not describe them in detail.

The float 18 is made preferably of thin metal, as copper, and may be of any desired shape, the form shown in Fig. 1 being that of a section of a cylinder. The float is provided with a sleeve 19 for the tappet rod 20, said sleeve being tightly secured with air tight joints to the upper and lower walls of the float 18.

The sleeve 19 is traversed by the tappet rod 20, and slides freely thereon between the rod-operating tappet blocks 21 and 22, and, by means of the lever 23 and suitable connections, serves to operate the valve parts (not shown) which are housed within the bonnet 16.

Preferably I provide a ring 24 on the top of the float which fits closely, although it does not engage the casing 12, and will act as a sort of piston as the float rises and falls, and, furthermore, serves as a counter-weight so as to give a weight to the float substantially equal to its lifting power when submerged.

I provide the float in its upper wall with a pressure-equalizing inlet-valve comprising the valve-seat 25; the disk-valve 26, having a stem which is connected with a sliding thimble or spider 27; which is open at its top to permit pressure to pass therethrough, and the spring 28, being interposed between the valve body 25 and the thimble or spider 27, which spring is of sufficient strength to normally hold the valve-disk 26 to its seat, but will permit it to open readily in event of increase of pressure outside of the float 18 over its internal pressure.

When pressure is admitted to the trap 12, it will be obvious that the valve 26 will at once open against the tension of the spring, admit pressure to the float 18, and so equalize pressure on the inside and outside of the float, and no crushing of the float can occur.

I provide a second valve in the upper wall of the float to serve as a pressure-equalizing outlet-valve, this second valve comprising a valve casing 29, having a seat in one end which receives a disk valve 30 that is free to move to and from its seat, but is prevented from being accidentally displaced by means of a cross wire or spider 31. The valve casing 29 extends from the top of the float into the same nearly to the bottom thereof, the lower end being open that water of condensation or from any other source within the float may be forced up through the casing and past the valve 30 whenever the external pressure upon the float is less than its internal pressure.

When vacuum is present in the trap 12 the valve 30 will at once open, equalizing vacuum inside and outside of the float, so that no distortion of the float by reason of unequal pressure under vacuum can take place.

With a float of this character it will be obvious that in places where alternate pressure and vacuum are put upon it, each condition will be taken care of by the valves described, one of which will admit pressure, when pressure is present, to the interior of the float, and the other of which will immediately bring about a condition of vacuum interiorly of the float, when vacuum exists exteriorly thereof, and all danger of destruction or distortion of the float is avoided.

In Fig. 2 I have shown a rising and falling float 32 of spherical form, having the inlet valve 33 and the outlet valve and ejector pipe 34, similar in construction to those described in connection with Fig. 1, but adapted to the spherical type of float shown in Fig. 2.

Fig. 3 illustrates the float 35 of the ordinary swinging arm type, with the pressure-equalizing inlet valve 36 and pressure-equalizing outlet valve 37 adapted thereto.

It will be understood that departures within the range of mechanical skill from the constructions herein described may be made without deviating from the principle of my invention, and all such expedients I regard as within the purview thereof.

Having thus described my invention what I claim is:—

1. A closed hollow float having an inwardly opening valve in the top thereof, means for holding said valve normally closed under equal pressures within and without the float to prevent the entrance of water thereinto through said inwardly opening valve and to permit the equalizing of pressures within and without the float through the opening of said valve when internal pressure is less than external pressure, a tube within said float extending from the top nearly to the bottom, and a normally closed outwardly opening valve at the top of said tube through which tube and valve pressures are equalized and any water in the float forced out when the external pressure is less than internal pressure.

2. A closed hollow float having an inlet valve at the top thereof, a spring for holding said valve in closed position when internal and external pressures on the float are equalized, but adapted to open on excess of external pressure and admit said pressure into the float, a second gravity closed valve also in the top of the float that opens under excess of internal pressure, and an ejector tube extending from said valve into the float nearly to the bottom thereof through which fluid within the float is driven out when the internal pressure is greater than the external pressure.

In testimony whereof I have hereunto set my hand in presence of two subscribing witnesses.

JARARD W. LYTTON.

Witnesses:
A. V. CUSHMAN,
GERTRUDE M. STUCKER.

Copies of this patent may be obtained for five cents each, by addressing the "Commissioner of Patents, Washington, D. C."